United States Patent [19]

Fesko

[11] Patent Number: 4,489,922

[45] Date of Patent: Dec. 25, 1984

[54] SPRING LEAF COMPRISING PULTRUDED BEAM

[75] Inventor: Donald G. Fesko, Allen Park, Mich.

[73] Assignee: Ford Motor Company, Dearborn, Mich.

[21] Appl. No.: 150,547

[22] Filed: May 16, 1980

[51] Int. Cl.$^3$ .............................................. F16F 1/36
[52] U.S. Cl. ................... 267/149; 273/73 F; 273/DIG. 23; 428/251
[58] Field of Search ............... 267/49, 50, 158, 148, 267/149; 273/DIG. 23, 73 C, 73 F, 73 J; 9/6 P; 428/246, 251

[56] References Cited

U.S. PATENT DOCUMENTS

| | | | |
|---|---|---|---|
| 2,052,062 | 8/1936 | Wallace | 267/47 |
| 2,600,843 | 6/1952 | Bush | 267/148 |
| 2,829,881 | 4/1958 | Morris | 267/148 |
| 3,142,598 | 7/1964 | Rosen | 267/149 |
| 3,292,918 | 12/1966 | Hart | 267/11 R |
| 3,493,222 | 2/1970 | Mathers et al. | 267/54 R |
| 3,530,212 | 9/1970 | Kienle et al. | 264/137 |
| 3,718,161 | 2/1973 | Woodson | 273/73 F |
| 3,761,345 | 9/1973 | Smith | 273/73 F |
| 3,787,051 | 1/1974 | Johns | 273/DIG. 23 |
| 3,900,650 | 8/1975 | Sedore | 273/73 F X |
| 3,968,958 | 7/1976 | Huchette et al. | 267/47 |
| 4,256,525 | 3/1981 | Allen | 428/251 X |
| 4,260,143 | 4/1981 | Kliger | 267/148 |

FOREIGN PATENT DOCUMENTS 2021731 12/1979 United Kingdom ............... 267/149

OTHER PUBLICATIONS

Part Page No. 14-31-1 of 1979 Ford Light Truck Manual.

Primary Examiner—George E. A. Halvosa
Attorney, Agent, or Firm—Peter D. McDermott; Roger L. May

[57] ABSTRACT

A vehicular spring leaf comprises a pultruded beam that has about 40–75% by volume filamentary solids of a first modulus and a remainder fraction comprising continuous organic solid of a second, lower modulus that binds together the filamentary solids. A first portion of at least about 80% by weight of the filamentary solids is a multitude of discrete, tensilely stressed filamentary solids, densely packed substantially uniformly throughout the organic solid and coextending the beam longitudinally in a plurality of planes that accept tensile or compressive stress, respectively, upon a flexure of the leaf that bends the beam. A second portion of up to about 10% by weight of filamentary solids is randomly oriented on a surface of the beam, and a third portion of up to about 10% by weight of filamentary solids is woven oriented substantially across one another in one of the planes.

5 Claims, 9 Drawing Figures

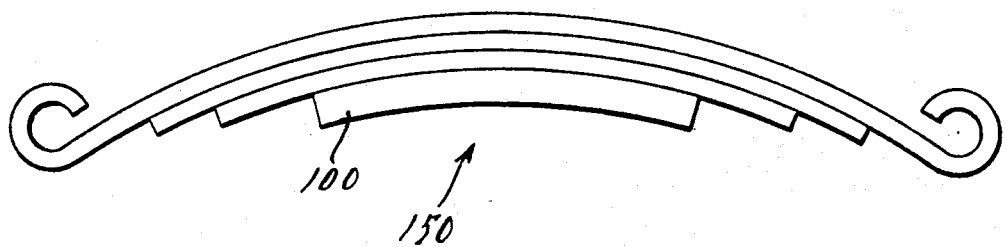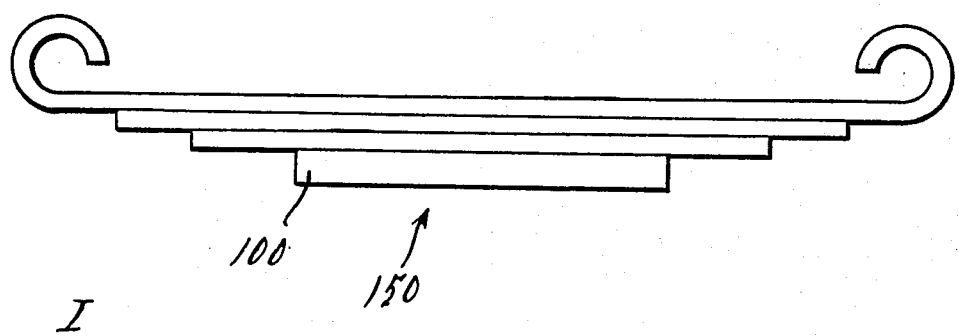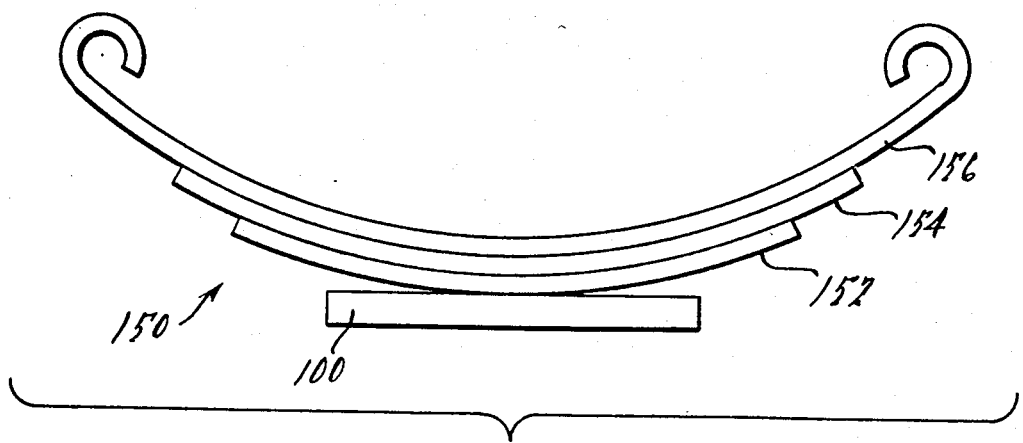
FIG. 1.

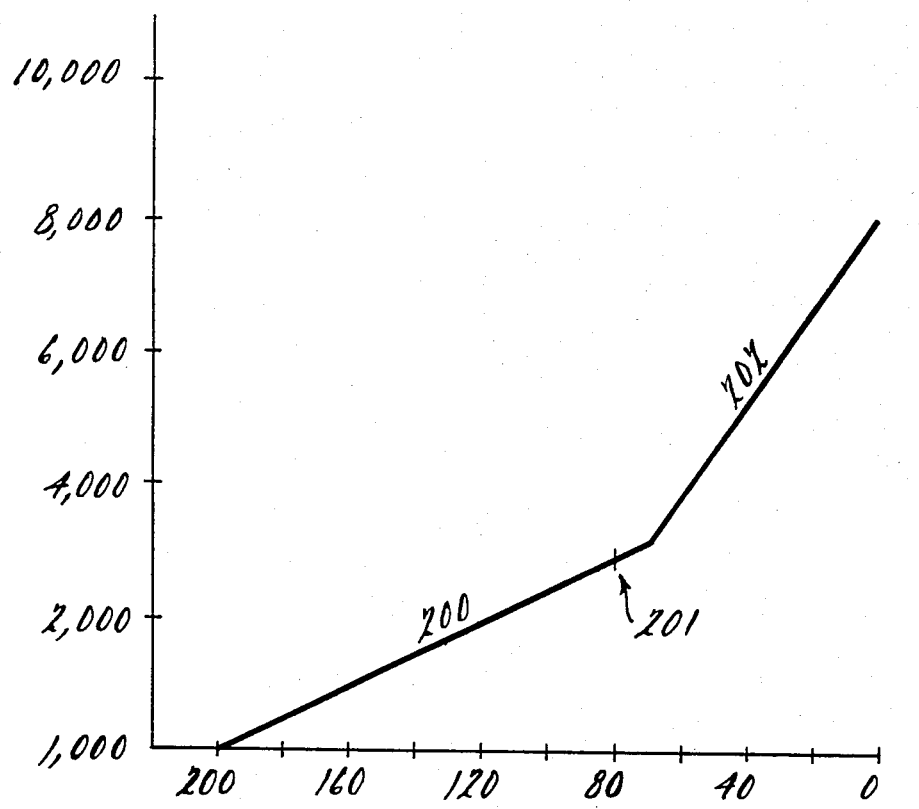
FIG. 2.
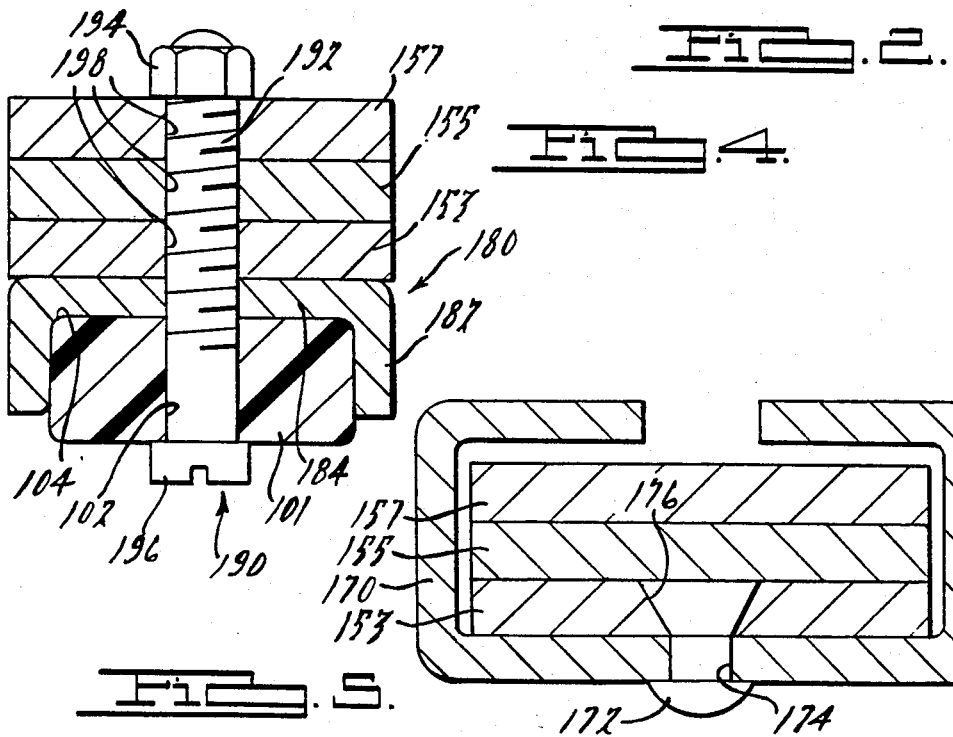
FIG. 4.
FIG. 5.

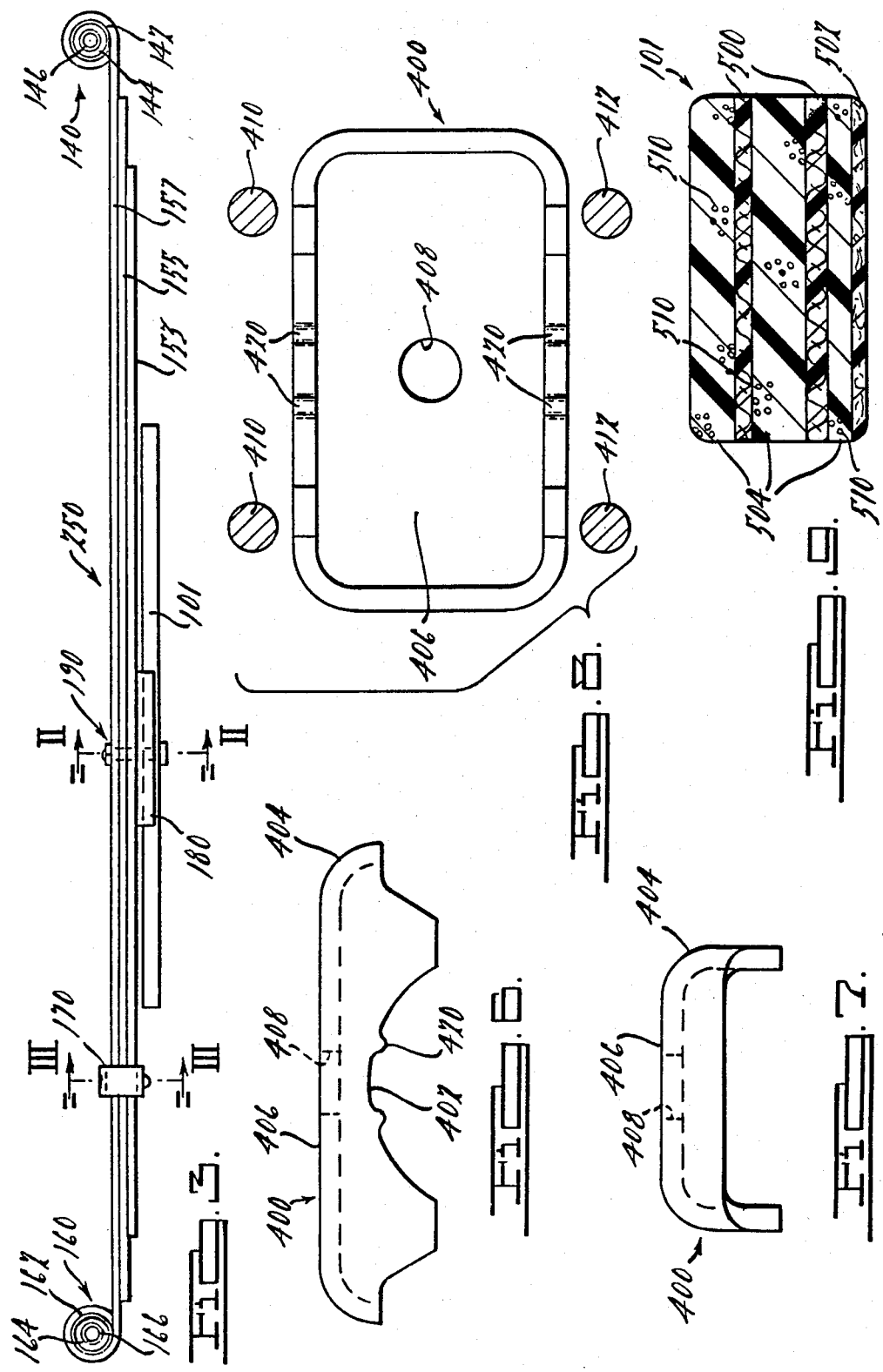

SPRING LEAF COMPRISING PULTRUDED BEAM

BACKGROUND OF THE INVENTION

This invention relates to vehicular suspension. More particularly, this invention relates to a light weight leaf for a multileaf spring. The leaf comprises about 40–75% by volume filamentary solids of a first modulus and a remainder comprising continuous organic solid of a second, lower modulus.

Multileaf vehicular springs are known. See, for example, U.S. Pat. No. 2,052,062; 3,292,918 and 3,493,222. Moreover, springs comprising leaves which contain filamentary solids in an organic solid are also known. See, for example U.S. Pat. Nos. 2,600,843; 2,829,881 and 3,142,598. The leaf of this invention differs from those in such patents in that it is a discrete leaf which comprises a pultruded beam that has filamentary solids densely packed in certain fashion throughout a continuous organic solid.

It is an object of this invention to provide a light weight spring leaf.

BRIEF DESCRIPTION OF THE INVENTION

This invention relates to a vehicular spring leaf. The leaf is relatively light weight. The leaf comprises a pultruded beam with about 40–75% (preferably about 50–60%) by volume filamentary solids and a remainder fraction (preferably about 60–25%, more preferably about 50–40% by volume) of continuous organic solid. The organic solid binds together the filamentary solids. At least about 80% (more preferably, at least about 90%) by weight of the filamentary solids comprises a multitude of discrete, tensilely stressed, filamentary solids, densely packed substantially uniformly throughout the organic solid. These discrete, tensilely stressed and densely packed, filamentary solids coextend the beam longitudinally in a plurality of planes that accept tensile or compressive stress, respectively, upon a flexure of the spring that bends the beam.

In preferred embodiments, the beam has between about 50–60% by volume glass fiber and more preferably more glass than organic solid by volume. Up to about 10% by weight of the filamentary solids comprises randomly oriented filamentary solids in a mat on a surface of the beam that receives longitudinal compressive stress. Up to about 10% by weight of the filamentary solids comprise woven filamentary solids that have fibers oriented across one another substantially in a plane of the aforementioned planes. In certain embodiments, the beam has a configuration that is substantially straight along a longitudinal axis without the aforementioned flexure. The beam has a cross-section that is preferably substantially rectilinear.

In especially preferred embodiment, this invention relates to a multirate, multileaf vehicular spring. In such spring, a first leaf (normally a set of leaves comprising a first leaf) acts independently of a second leaf under a first load; but it acts together with the second leaf under a second load which is greater than the first load. The first load has ends adaptable to attach the spring to a vehicle at first and second vehicle locations. The second leaf has a center section bindable with a center section of the first leaf to the vehicle at a third vehicle location. The third vehicle location is between the first and second vehicle locations.

The improvement of the invention with respect to such a multirate spring comprises a second leaf that is a light weight leaf. The light weight leaf comprises a beam, preferably straight, that has about 40–75% (preferably about 50–60%) by volume filamentary solids of a first modulus. A remainder fraction (preferably about 60–25%, more preferably about 50–40% by volume) comprises continuous organic solid of a second, lower modulus. The organic solid (e.g., vinylester or polyester or epoxy thermoset resin) binds together the filamentary solids. At least about 80% (preferably at least about 90%) by weight of the filamentary solids comprise a multitude of discrete, tensilely stressed filamentary solids, densely packed substantially uniformly throughout the organic solid. These discrete, densely packed and tensilely stressed, filamentary solids coextend the beam longitudinally in a plurality of planes that accept tensile or compressive stress, respectively, upon a flexure of the spring that bends the beam. The beam in these especially preferred embodiments is preferably substantially straight under the aforementioned first load. The beam preferably has a configuration that has a substantially rectilinear cross section. The beam also has a preferred glass content as well as random and woven filamentary solids as noted hereinabove.

BRIEF DESCRIPTION OF THE DRAWINGS

FIG. 1 illustrates schematically operation multirate spring 150 in accordance with this invention. Configurations I, II, and III denote spring conditions, somewhat exaggerated for purposes of illustration, under increasingly larger loads.

FIG. 2 illustrates graphically spring rates for multirate spring 250 of FIG. 3. The ordinate is load in newtons; the absissa is spring height in millimeters.

FIG. 3 illustrates multirate spring 250 of this invention. Main leaf 157 appears in flat main leaf condition.

FIG. 4 illustrates the spring of FIG. 3 looking in from II—II of FIG. 3.

FIG. 5 illustrates the spring of FIG. 3 looking in from III—III of FIG. 3.

FIG. 6 shows spring seat 400 upon which a spring such as in FIG. 3 may mount. The curvature shown as 402 accepts an axle member.

FIG. 7 shows another view of spring seat 400 of FIG. 6. This view is looking up into the seat from a position of the axle. U-bolts have sections 410 and 412, respectively, that are part of a U-bolt assembly.

FIG. 8 is another view of spring seat 400 of FIG. 6.

FIG. 9 is a cross-section of beam 101 of FIG. 4 that illustrates composition with respect to continuous and discrete filamentary solids.

DETAILED DESCRIPTION OF THE INVENTION

This invention relates to leaf springs comprising a light weight leaf. In preferred embodiments the spring is a multileaf, multirate spring comprising a second stage leaf that is the light weight leaf. The light weight leaf in these embodiments has an unloaded configuration that is substantially straight.

FIG. 1 of the drawings schematically illustrates operation of multileaf, multirate composite spring 150 of this invention. Spring 150 has main leaf 156 and other leaves 152 and 154. The composition of leaves 152, 154 and 156 is steel. Spring 150 additionally has leaf 100. Leaf 100 comprises glass fibers in a thermoset matrix.

Configuration I of FIG. 1 shows multirate spring 150 under a first load. Spring 150 conforms to configuration I, when, for example, a vehicle carrying it is unloaded, e.g., "curb position."

Configuration III of FIG. 1 shows multirate spring 150 under a second load, greater than the first load. Spring 150 conforms to Configuration III, when, for example, a vehicle carrying has a capacity load, i.e., "normal load."

Configuration II of FIG. 1 shows multirate spring 150 under a load intermediate between the first and second loads. In Configuration II, spring 150 is in transition between first and second spring rates. The first spring rate has configuration from leaves 152, 154 and 156. The second spring rate has an additional contribution from leaf 100.

Configuration II of FIG. 1 shows main leaf 156 without camber. This position is commonly referred to as "flat main leaf". Flat main leaf may occur before or after transition between first and second spring rates.

FIG. 2 approximates graphically a load (y axis in newtons)—deflection (x axis, in millimeters) curve for multirate spring 250 of FIG. 3. The deflection measurement corresponds to overall spring height. The spring is unclamped and mounted on rollers during measurements.

The slope of line 200 corresponds to a spring rate of multirate spring 250 when it is in a configuration like I of FIG. 1. The slope of line 202 corresponds to a spring rate of spring 250 when it is in a configuration like III of FIG. 1. The intersection of lines 220 and 202 represents a transition between the spring rates.

Demarcation 202 approximates flat main leaf configuration for multirate spring 250. Flat main leaf of spring 250 occurs before transition because spacer 180 (FIG. 3) delays engagement of leaf 101 with the other leaves.

FIG. 3 shows with greater particularity an embodiment of this invention. Multirate spring 250 has a set of leaves 153, 155 and 157; leaf 157 is the main leaf. Leaves 153, 155 and 157 comprise steel; they give spring 250 a first spring rate. Spring 250 has additional leaf 101. Leaf 101 comprises glass fibers in a thermoset matrix; it gives spring 250, with leaves 153, 155 and 157, a second spring rate.

Main leaf 157 of multirate spring 250 has "eyes" 140 and 160. Eyes 140 and 160 comprise integral curvatures 162 and 142 of main leaf 157. Eyes 140 and 160 contain press fitted bushing material 144 and 164. respectively. Within press fitted bushing material are metal sleeves 146 and 166, respectively. Spring 250 mounts to a vehicle through sleeves 146 and 166 at first and second vehicle locations, i.e. (a) the chassis or body on either side of the axle or (b) the axle at spaced locations. Sleeves 146 and 166 mount, respectively fixedly and translatablly at spaced vehicle locations. Thus, as leaves of multirate spring 250 flex, multirate spring 250 has an end that translates upwardly or downwardly at the translatable mount (e.g., shackle).

Clip 170 of FIG. 3 holds leaves 153, 155 and 157 together; it prevents excessive splaying of leaves 153, 155 and 157. An additional clip (not shown) may also hold leaves 153, 155 and 157 at a corresponding, opposite end portion of multirate spring 250. Spring 250 of FIG. 3, mounts fore and aft of the vehicle axle. Clip 170, which is forward of the axle, thus prevents entry of gravel or other particulate between leaves 153, 155 and 157, particularly during acceleration of the vehicle.

Fastening means 190 of FIG. 3 extends through leaves 153, 155, 157 and 101; it permits alignment of spring 250 in spring seat 400 of FIGS. 6, 7 and 8. Fastening means 190 also extends through spacer 180 as shown more particularly in FIG. 4. Spacer 180 delays engagement of leaf 101 beyond "flat main leaf" condition of main leaf 157. Spacer 180 comprises aluminum but may be any other such formable material.

FIG. 4 is a section taken of multirate spring 250 looking in at II—II of FIG. 3. Fastening means 190, as shown, comprises threaded bolt 192 having cap 196 and nut 194. Bolt 192 fits snugly in orifice 198 of leaves 153, 155 and 157 and orifice 102 of leaf 101. Cap 196 fits into orifice 408 of spring seat 400. Spacer 180 of FIG. 4 has integral creep resistors 182 that wrap leaf 101. Leaf 101 has curvatures 104 that fit snugly into the intersection of spacer portion 184 and creep resistance portions 182 of spacer 180. Creep resistance portions 182 of spacer 180 resist creep of leaf 101 during operation of multirate spring 250.

FIG. 5 shows a cross section of clip 170 looking in at III—III. Rivet 172 fits tightly into orifices 172 and 174 of clip 176 and leaf 153, respectively. The head of rivet 172 maintains engagement of clip 176 with leaf 153.

FIGS. 6, 7 and 8 show side views and a bottom view (looking up form the axle) of spring seat 400. Seat 400 comprises a top, flat portion 406 upon which multirate spring 250 rides. Flat portion 406 has a width equal or slightly greater than the width of leaf 101; it has a length about two times its width. Seat 400 has orifice 408. Bolt head 196 fits into orifice 408.

Spring seat 400 has curvature 402. Curvature 402 mirrors axle housing (not shown) curvature. Nubs 420 interrupt curvature 402. During assembly of multirate spring 250 to a vehicle, nubs 420 provide metal that welds seat 400 to the axle housing. Nubs 420, accordingly, disappear during welding operation.

Spring seat has an external curvature shown by 404 in FIGS. 6 and 7. Curvature 404 slopes away from flat portion 406. Thus, flat portion 406 exists as a plateau upon which multirate spring 250 rides. The plateau provides smooth engagement between beam 101 and seat 400.

FIG. 8 is a view of spring seat 400 looking up from an axle position. FIG. 8 shows sections 410 and 412 of members of U-bolt assemblies. The U-bolt assemblies are conventional; they wrap around the axle housing. They engage a single plate above leaf 157 of FIG. 3.

FIG. 9 illustrates a section of leaf 101. The section is substantially rectilinear with corners having a small radius. Leaf 101 comprises filamentary solids in a continuous organic solid.

FIG. 9 illustrates material composition at a cross-section of leaf 101. Sections 500, 502 and 510 of leaf 101 show relative position and character of filamentary solids in thermoset matrix 504. Sections 500, 502 and 510 extend the length of leaf 101.

Leaf 101 has about 54% by volume filamentary solids which comprise glass fibers; the remainder of leaf 101 is a continuous organic solid (thermoset polyester resin) that binds the filamentary solids together.

Leaf 101 of FIG. 9 has been made by a pultrusion process. In the pultrusion process, pullers draw resin coated filaments through a heated die. The resin hardens in the die. Examples of pultrusion processes appear in U.S. Pat. Nos. 4,154,634; 3,853,656; 3,793,108; 3,684,622; 3,674,601; 3,530,212; and 2,741,294.

Leaf 101 of FIG. 9 has three orientations of filamentary solids. Greater than about 95% by weight of the filamentary solids comprise a multitude of discrete, tensilely stressed, filamentary solids densely packed substantially uniformly throughout thermoset polyester 504. These densely packed, tensilely stressed, filamentary solids coextend leaf 101 in a plurality of planes. The planes receive tensile or compressive stress upon flexure of multirate spring 250 (FIG. 3) that bends leaf 101. Ends of a portion of such tensilely stressed solids appear as 510 in FIG. 9. (Ends 510 are slightly enlarged relative to the remainder of leaf 101. Also, ends of other of these filamentary solids, substantially uniformly dispersed throughout leaf 101, have been omitted from FIG. 9 for clarity).

Less than about 2% by weight of the filamentary solids of leaf 101 comprises randomly oriented filamentary solids. Portion 502 in FIG. 9 shows position of these randomly oriented filamentary solids in leaf 101. The randomly oriented solids form a mat (e.g., glass fiber mat) on a surface of leaf 101. The mat side of leaf 101 rests on spring seat 400 in multirate spring 250 of FIG. 3. (Portion 502 exaggerates for purposes of illustration the relative volume taken by the randomly oriented filamentary solids. The mat of leaf 101 is actually only a few glass fibers thick.)

Less than about 2% by weight of the filamentary solids in leaf 101 comprise a weave of filamentary solids. The weave is held tightly within the above noted multitude of filamentary solids. Portions 500 of FIG. 9 illustrate positions of the weave in leaf 101. The weave has filamentary solids positioned across one another. The weave contains fibers that are traverse to the long dimension of leaf 101. These traverse fibers reduce creep of leaf 101 in multirate spring 250. (Portions 500 exaggerate for purposes of illustration the relative volume taken by the weaves. Each weave in leaf 101 is compressed such that it has a volume that is about 1 or 10 fibers thick in a cross section of leaf 101.)

The weave of filamentary solids in leaf 101, as mentioned, reduces creep of leaf 101 in multirate spring 250. In an alternative embodiment of multirate spring 250, leaf 101 comprises such weave but omits spacer creep resistors 182 shown in FIG. 4. In this embodiment leaf 101 and leaves 153, 155 and 157 have equal widths.

In still other embodiments, leaf 101 is as above described with respect to continuous and filamentary solids, but, when unloaded, has camber. In a multirate spring embodiment, such a cambered leaf may engage leaves 153, 155 and 157 before or after flat main leaf position of leaf 157 in FIG. 3, depending, for example, on whether leaf 101 has a positive or negative curvature with respect to leaf 157. In still other multirate spring embodiments, such a cambered leaf replaces a leaf of the first set of leaves as well as the second stage leaf.

What is claimed is:

1. A vehicular spring leaf which comprises a pultruded beam that has about 40–75% by volume filamentary solids of a first modulus and a remainder fraction comprising continuous organic solid of a second, lower modulus that binds together said filamentary solids, a first portion of at least about 80% by weight of said filamentary solids being a multitude of discrete, tensilely stressed filamentary solids, densely packed substantially uniformly throughout said organic solid and coextending said beam longitudinally in a plurality of planes that accept tensile or compressive stress, respectively, upon a flexure of said leaf that bends said beam, a second portion of up to about 10% by weight of said filamentary solids being randomly oriented filamentary solids on a surface of said beam, and a third portion of up to about 10% by weight of said filamentary solid being woven filamentary solids oriented substantially across one another in one plane of said planes.

2. A leaf in accordance with claim 1, wherein said filamentary solids comprises glass.

3. A leaf in accordance with claim 2, wherein said beam is substantially straight without load.

4. A leaf in accordance with claim 3, wherein said beam has a cross section that is substantially rectilinear.

5. A leaf in accordance with claims 1 or 2 or 3 or 4, wherein said organic solid comprises a vinyl or polyester thermoset resin.

* * * * *